May 8, 1956 J. M. BLACKHALL 2,744,968
POSITION-THEN-LOCK JACK
Filed May 15, 1951 2 Sheets-Sheet 1

INVENTOR.
James M. Blackhall,
BY Brown, Jackson,
Boettcher & Dienner
attys.

May 8, 1956 J. M. BLACKHALL 2,744,968

POSITION-THEN-LOCK JACK

Filed May 15, 1951 2 Sheets-Sheet 2

INVENTOR.
James M. Blackhall,
BY Brown, Jackson,
Boettcher & Dienner
Attys.

United States Patent Office 2,744,968

Patented May 8, 1956

2,744,968

POSITION-THEN-LOCK JACK

James M. Blackhall, Galion, Ohio, assignor to North Electric Company, Galion, Ohio, a corporation of Ohio Application May 15, 1951, Serial No. 226,372

12 Claims. (Cl. 179—91)

The present invention relates in general to automatic telephone exchanges and in particular, to new and novel multiple jack connection means especially adapted for use in telephone exchanges.

The many inherent advantages and features of all-relay type telephone exchange equipment have been long acknowledged in the field, and there has been a definite preference for the use of such equipment in smaller size telephone exchanges. Although the same features and advantages accrue in the use of all-relay equipment in exchanges of larger sizes, the greater initial cost and the somewhat inflexible nature of the equipment (as compared to the more mechanical type arrangement) has placed the all relay system at a competitive disadvantage in the larger size installations. As a result the scope of application of the all relay type systems in the field has been limited.

There has been set forth in a copending application which was filed May 15, 1951, by Blackhall et al. and received Serial No. 226,371, and was assigned to the assignee of this invention, an all-relay system which is especially adapted for universal use in large and small exchanges alike, such system including all the important advantages without impairment, which are inherent in all-relay type telephone systems.

The system set forth thereat is competitive in installations of all sizes, and is superior in performance, flexibility and adaptability to most known types of telephone systems.

The system is comprised, as in previous arrangements, of a plurality of one hundred line subscriber bays interconnected to form an exchange, the number of bays being dependent upon the number of subscribers to be secured.

A particular feature of the novel structure disclosed in the copending application is the manner in which the relay equipment of each bay is divided into relay groups, and each group is mounted on an individual holding strip, the holding strips being adapted for ready attachment to and removal from the bay as desired. In many instances, the operation of strip removal requires only the opening of a key and the removal of two holding screws. In other cases, a preliminary operation consisting of the removal of a wedge lock to multiple unit and a novel plug-in-jack may be required, the multiple lock being used to connect the terminals of the strip mounted relays to a series of interconnecting multiple members, and the plug-in-jack being used to effect the connection of a flexible cable to the bare wire multiples adjacent to the wedge lock to multiple equipment. At most the entire operation of removing a strip will take slightly over one minute. The provision of an exchange bay which is demountable in this manner is important to the achievement of an all-relay type exchange which has universal application and adaptability.

Essential to the accomplishment of a demountable exchange in which entire groups or strips of relays may be instantaneously disconnected from the other exchange equipment and completely detached from the exchange framework, is the provision of disconnect means for interrupting the connections which extend from the relays on each strip to other relay units in the exchange. The relays on a single strip of line finders, for example, may have over one hundred connections with the other relay equipment in the exchange which must be interrupted each time the strip is removed. The provision of compact, convenient and rapid operating means for effecting the interruption of over a hundred connections in any equipment is in itself a serious problem. However, in the communication art, even further difficulties are encountered for the equipment used in this field is necessarily limited in size by the inherent nature of telephone exchange equipment. As a result of the limited size of the equipment, a correspondingly smaller area of contact is afforded between the various connecting members. It is apparent that with even the slightest latitude in movement between the contacting members, the initially small area of contact is disturbed, and it is therefore essential that any connecting means provided for the described use be capable of effecting positive and reliable contact. A further difficulty which is attributable to the small contact surface results from the accumulation of deposits of foreign material such as dirt, moisture, etc. on the contacts, whereby extremely poor conduction is effected over the contact and poor subscriber service results.

These field handicaps and problems are considerably minimized with the application of physical pressure to each of the contact completing members, the more positive contact between the members preventing lateral displacement as well as minimizing the harmful effect of accumulated material thereon.

The problem of providing an all-relay demountable type exchange is thus further burdened by the requirement for the provision of means which are both capable of performing multiple contact completion and interruption; of repeatedly positioning as many as one hundred sets of circuit-completing contacts in each operation; of applying holding pressure to each of these contacts; and of maintaining such pressure for the entire duration of member contact.

It is a primary object of this invention to provide a novel "position-then-lock" jack means for effecting the convenient and ready pressure closing and opening of multiple circuit-controlling contacts which is especially adapted for use in the provision of a demountable all-relay telephone exchange board. It is an ancillary object of the invention to provide novel jack means which are compact in size, substantial in construction, economical in manufacture, and flexible in the application.

For a more complete understanding of the nature and scope of the invention, reference may be had to the detailed description of the demountable type exchange set forth in the heretofore mentioned copending application, and by reference to the accompanying drawings in which.

Figure 1:
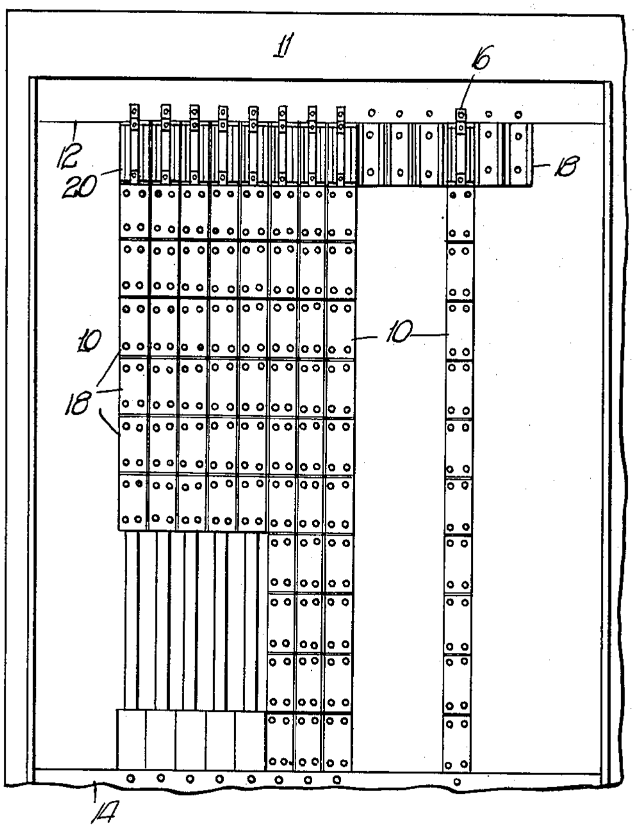
Figure 1 is a front elevation of a portion of a telephone exchange showing somewhat diagrammatically, the arrangement of a series of relay strips and their manner of connection to the frame of the exchange bay.

With reference to Figure 1, a portion of the demountable bay 11 of a telephone exchange thereshown to schematically illustrate the manner in which the relay equipment of the bay 11 may be divided for group mounting on suitable strip members 10, and the manner in which the strip members 10 are mounted and end fastened to frame members 12 and 14 of the bay by suitable fastening means, such as the screws indicated at 16. Reference to the aforementioned copending application may be had for a more complete description of the exchange framework and the specific division of the relay units 18 for strip mounting.

Each of the relay bearing strip members 10 is jack ended by a novel "position-then-lock" jack unit 20 which occupies the approximate space of a relay unit 18, each jack unit 20 being operative to interconnect the relay units 18 on the associated strip to other points in the exchange, and to provide a convenient means for completing or interrupting the connections whenever removal or attachment of the strip from or to the frame is desired.

The strip members 10 may be of any suitable frame cooperating structure, the members of the illustrated embodiment comprising a channel shaped back or support bar 22 (Figure 2) which is apertured at appropriate points along its length to accommodate the fastening thereto of the various relay units 18 of the strip group. The strip channel 22 converges at the jack end of the strip, as indicated at 24, and terminates in a projecting flat lug portion 26 which is angled slightly from the vertical to facilitate engagement thereof with the frame member 12. The opposite end of the strip also terminates in a lug member 26 which is similarly angled to facilitate connection with frame member 14.

Apertures 28 in the projecting end of each strip receive the fastening means, such as the illustrated screw means 16, which pass therethrough for threaded engagement with the tapped apertures 30 located in the supporting main frame members 12. Two apertures 32 are located at the jack end of each strip 10 to facilitate positioning thereof in the same relative manner with each assembly thereof.

With reference to Figures 3, 4, 5 and 6 of the drawings, it will be apparent that the novel "position-then-lock" jack 20 is comprised of a first or frame-mounted portion 34 and a second or strip mounted portion 36. Frame-mounted portion 34 of the jack 20 comprises a channel-shaped back member 38, the end of which is flattened for ready physical contact with the main frame member 12 to which it is affixedly attached by suitable fastening means such as the screw means illustrated at 40. A pair of guide pins 42 are mounted on the central axis of the channel back member 38 within the confines of the side flanges thereof. Guide pins 42 have an enlarged base portion 44 from which a tapered shank 46 extends outwardly of the channel flanges. The base of the tapered shank 46 is indirect to eliminate the possible jamming of the two jack portions 34 and 36 in their mating. The channel 38 is mounted to the frame member 12 by screws such as 40, with the open side of the channel 38 facing the forward side of the exchange so as to receive the strip portion of the jack 36 therein as the strip is moved toward the channel 38 in a mounting operation. The width of the confines of the channel 38 is equivalent to the outer width dimension of the narrower channel portion 24 of strip member 10 and is an aid to the initial positioning of the jack portions as will be further described hereinafter.

Mounted on each side of the channel 38 are a plurality of Bakelite insulating supports 48, each of which are molded about a series of armature carrying reed members 50. The reed members are all of the same length, and the supports 48 serve to retain the reeds 50 in a set position in which the reeds coextensively rearwardly and forwardly of the Bakelite support members 48 for circuit connecting purposes. A spacer strip of insulation 52 is positioned between each of the adjacent reed bearing strips 48 on each side of the channel 38 and a metal clamping strip 54 is mounted on each of the outer faces of each group of supports. The supports 48, strips 52 and strips 54 are secured to the sides of the channel by means of screws 56 which project through the various members and into tapped holes in the sides of the channel 38, to rigidly fasten the reed carrying assemblies to the channel 38.

Each reed member 50 carries an armature 58 at its forwardly projecting end, the armatures each having a pair of precious metal contacts 60 which are mounted parallel to each other and to the longitudinal axis of the armature. The contacts 60 are formed of a suitable arc and wear resisting material which is preferably a gold alloy. The armatures may be fastened to the reeds in the manner shown in either Patent 2,396,332, issued March 12, 1946, to F. R. McBerty, or Patent 2,550,578, issued April 24, 1951, to R. K. McBerty, both of which are assigned to the assignee of this invention.

The opposite ends of the reeds project rearwardly of the channel support to permit ready connection of flexible cables thereto and are held in insulated space relation by beads 62 of suitable insulating material which are molded about the projecting reed end portions of each series of reeds.

Figure 3:
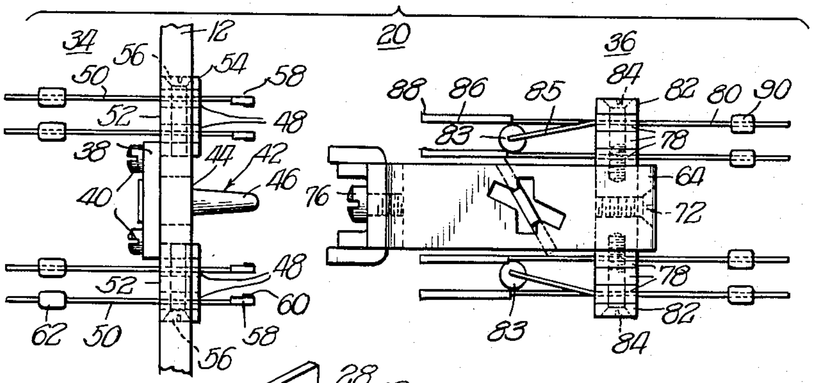
Figure 3 is a top plan view of the frame and strip portion of the jack.

The dimensions of the strip member elements may vary with the nature of their use and application. In the jack equipment adapted for use with all-relay telephone equipment, the reeds are approximately 1⅞ inches in length whereby the cubic dimension of the basic frame mounted portion of a jack having four contact banks as illustrated in Figure 3 would be approximately 1¾ by 1⅞ by 2⅞ inches. As more contact banks are added the width of the assembly will be correspondingly increased.

The strip mounted portion 36 of the jack 20 comprises a C-shaped base member 64 having means at the open end of the C for attaching same to the channel strip. The base member 64 in the present embodiment is comprised of a base plate 66 (Figure 2), an upper arm member 68 and a lower arm member 70 to facilitate assembly and disassembly of the unit, it being apparent that the member may be of one piece if desired.

The forward ends of the arms of the C base are bent inwardly to form flange ends 74 which are apertured to receive suitable fastening means such as screws 76 for fastening the jack portion 36 to the narrow portion 24 of the strip channel 22. Other equivalent means of construction of the C frame are at once evident to those skilled in the art.

Extending along the sides of the base plate member 66 are a series of molding strips 78 made of suitable insulating material, alternate ones of which have armature carrying reed members 80 integrally molded therewith. Molding strips between the alternate reed bearing members serve as insulated spacers to provide operating clearance of the armatures of the adjacent banks. A metal reed clamping strip 82 extends along the outer face of each group of moldings and screws 84 project through the metal clamping strip and the assembled moldings into the base plate 66 to fasten the reeds in a given fixed plane relative to the relay strip, such plane being parallel to the longitudinal axis of the strip. The molding strips 78 which are not immediately adjacent to the frame also mount a cylindrical secondary actuator means member 83 of insulating material. The member 83 may be tubular or provided at each end with an axial bore and is supported by reeds 85 which are carried by and integrally molded with the molding strips for the associated reed bank, the outer ends of the reeds 85 being bent inwardly for reception in the axial bore in the member 83. The reeds 85 support and position the secondary actuators 83 between adjacent banks of reeds 80 at the base or heel of the armatures carried by the reeds. Banks of reeds may be added to those shown in the drawings along with the spacer strip of insulation in an obvious manner whereby a multiple contact which is practically unlimited in scope is provided. It is of course obvious that other forms of frame construction may be adapted whereby the number of multiple contacts may be practically unlimited. Other possible forms of the frame structure might include a square whereby contacts might be arranged on four sides thereof for multiple operation in the basic manner described herein or any other geometrical design which extends to and includes a basic circular frame arrangement.

The reed members 80 of each bank are supported by the individual strips 78 to extend forwardly coextensively and rearwardly of the molding and each reed carries a contact bearing armature 86. A contact 88, formed of gold alloy wire or other precious metal material is secured to each armature 86 transversely of the longitudinal axis of the armature for circuit completing cooperation with the contacts 60 on the armatures 58 of the frame mounted portion 34 of the jack. The armatures 86 may be secured to one end of the reeds by any of the various methods set forth in the heretofore mentioned patents. The armature portion of each reed, as assembled with the frame, extends toward the channel 24 for a distance which is approximately ¾ of the width of the frame 64.

The other ends of the reeds which project to opposite side of the molding 78 are held in insulated spaced relation by molded beads 90 of suitable insulating material which are molded around the projecting end portions of each bank of reeds to support the reeds for ready connection with other conductor members.

Figure 4:
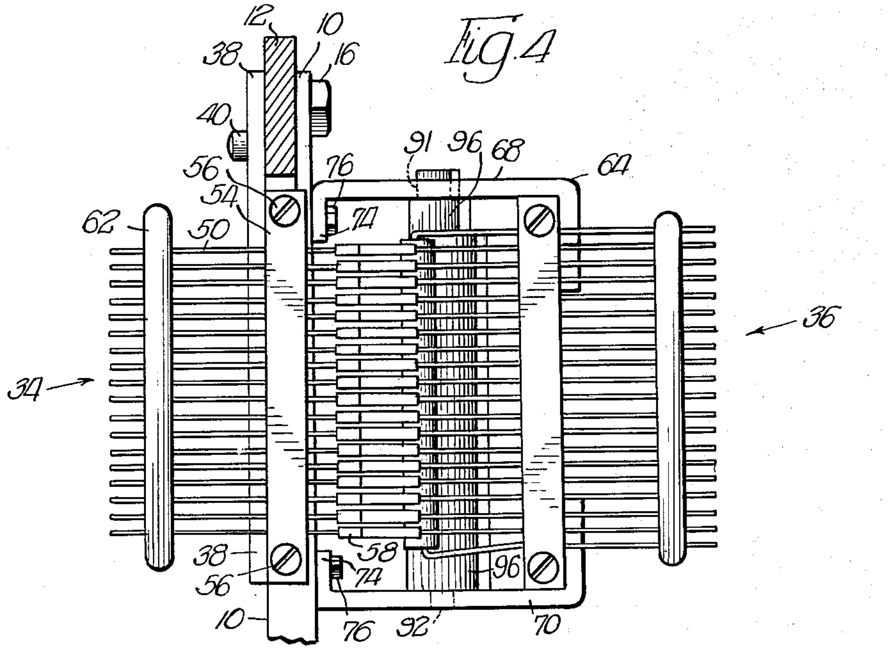
Figure 4 is a side elevation of the jack as assembled.

As shown in Figure 4, the lower arm 70 of the frame is apertured at approximately its center point 92 and the upper arm 68 is slotted obliquely to the plane of the frame as shown at 94. As actuator 96 formed of a wear resisting and insulating material, is provided with reduced end portion adapted to be received in the aperture 92 and slot 94, respectively, the actuator 96 comprises a rectangular member having a width slightly greater than the distance between the inner banks of reeds on each side of the frame. The actuator, in its nonoperated position, rests in a plane which is oblique to the plane of the contact bearing reeds positioned immediately adjacent frame and is out of contact therewith. Rotation of the actuator 96 to a plane which is perpendicular to the plane of the contact banks immediately adjacent to the frame moves the edges of the actuator into pressure contact with the reeds of the adjacent banks to flex the reeds outwardly away from the frame by a distance and a force which is determined primarily by the width of the actuator (which determines the plane of the edges of the actuator in its operated position) and the relative planes of the adjacent reed banks. Detent means 98 located in a plane perpendicular to the plane of the reeds serve to lock the primary actuator 96 in the operated position as rotated thereto.

Figure 2:
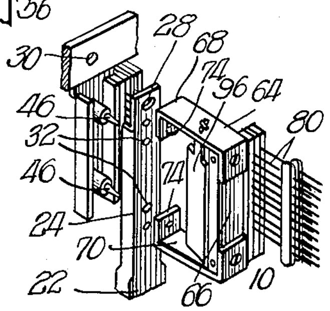
Figure 2 is a perspective view of the strip portion of the jack and its manner of assembly with the frame mounted portion of the jack.

The utility of the novel unit jack means disclosed herein is apparent from the foregoing description and its particular utility is exemplified by the application in a telephone exchange as disclosed in Figure 1. As there shown the relays mounted on strip members 10 are arranged to be disconnected from their connections with a series of other members of the exchange through the agency or means of the novel jack equipment disclosed herein. Specifically, the conductors extending to the other equipment in the exchange are mounted on the rearwardly extending portions of the reeds 50 on the frame mounted portion 34 of the jack 20 and the jack portion 34 is fixedly attached in proper position on the frame 12 through the agency of fastening screw means such as illustrated at 40, or any other suitable fastening means. As the corresponding strip of relays 10 to be mounted on the board is moved into position, as indicated in Figures 2 and 3, the apertures 32 which are disposed in the narrow portion 24 of the channel strip 22 are moved into position relative to the guide pins 46 located on the frame portion 34 of the jack 20. The actuator 96 at this time is in its non-operated position whereby it is out of contact with the reeds on the strip mounted portion of the jack and sufficient clearance is provided for the relative positioning of the armatures of both portions of the jack.

As the strip is brought into position the narrower portion 34 of the strip 22 fits within the confines of the channel portion of the U-shaped base member 38 on the frame mounted portion 34 of the jack 20 and serves to guide the jack into approximate position whereby added protection for the correct alignment of the contacts is provided.

As the strip is moved towards its final position, either manually or by tightening the screws 16, the tapered guide pins 46 are extended through the apertures 32 on the strip mounted portion of the jack and continued movement of the strip brings the base of the strip into contact with the enlarged diameter of the guide pins 46 to provide a firm resting base for the strip. The fastening means 16 extending through the apertures 28 and 30 of the jack and frame, respectively, are then completely tightened to secure the strip to the telephone exchange.

Figure 5:
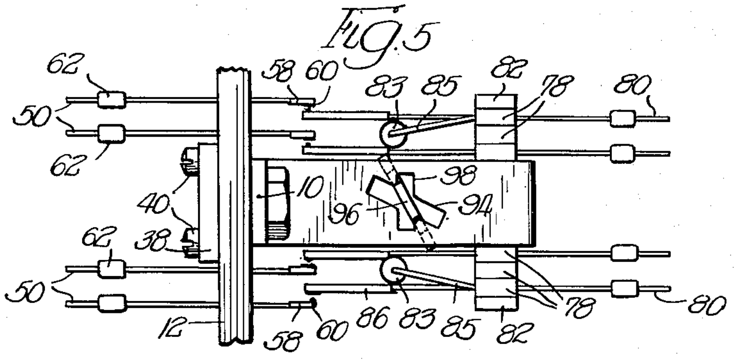
Figure 5 is a top plan view of the assembled jack prior to locking.
Figure 6:
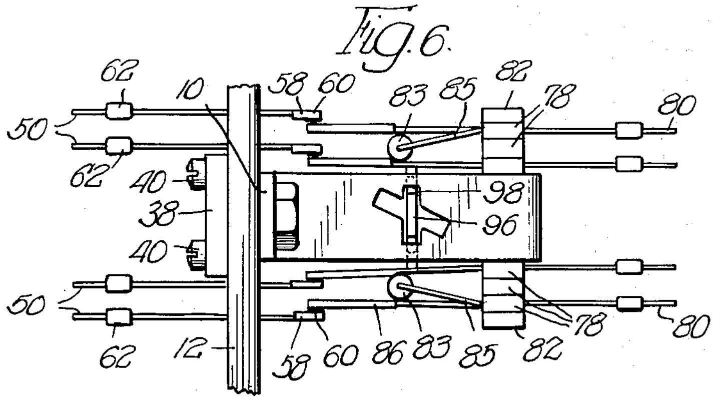
Figure 6 is a top plan view of the jack means in the locked position.

Upon completion of the insertion of the fastening means 16, the contacts of the respective banks of armature bearing reeds will be positioned relative to each other as illustrated in Figure 5, that is in aligned spaced relation. To complete the connections between the relays on the strip and the conductors which are connected to the rearwardly protruding portions of the reeds 50, the actuator 96 is rotated to its operated position, as shown in Figure 6, and the detent 98 serves to lock the actuator in its operated position. In its movement the actuator forces the armatures of the reeds of the banks adjacent the frame into contact with the armatures of the associated bank of reeds on the frame mounted portion of the jack. The first two armatures on the outer banks of reed members are forced into contact with the armatures of the associated frame mounted banks of reeds by the secondary actuators 83 which are moved outwardly of the frame by the inner or adjacent banks of reeds upon the outward flexing of those banks under urging of the primary actuator 96. The operation of further banks as added to the jack is the same as that of the outer banks of reeds; that is, each prior bank in the sequence operates an adjacent actuator to move a succeeding bank in the sequence.

As the actuator members 83 and 96 are operated to move the respective associated armatures toward one another, the transversely disposed contact on each armature of the strip mounted banks of reeds engages and bridges the pair of longitudinally disposed contacts on the respective armature of the frame mounted banks of reeds to effectively make contact between the associated reeds. Thereafter, the actuators apply pressure to all of the reeds to flex them out of their normal position, whereby pressure contact is effected to insure positive contact.

The disassembly of the equipment is effected by reverse operation. Briefly, the actuator 96 is moved to interrupt the connection of the relays on the strip to the conductors extending to other portions of the exchange, and the screw means 16 are removed, and the strip is detached from the exchange board.

Figure 7:

While any suitable means may be utilized to operate the actuator 96, a tool particularly convenient for this purpose is shown in Figure 7. The tool comprises a rectangular shaped bar having an oblique slot located at one end thereof, the slot conforming to the shape of the portion of the actuator 96 which extends above the frame. With the placement of the slot over the end of the actuator, the remaining portion of the bar serves as a lever handle and rotation of the actuator is readily affected by proper movement of the handle.

From the foregoing description, it will be apparent that the present invention provides a locking device or structure that facilitates the ready assembly, disassembly and interconnection of contact or jack units, the interconnection of cooperating contacts being effected under high pressure to insure the positive contact therebetween essential to satisfactory telephone service. The present invention renders the highly desirable all-relay telephone systems adaptable to any and all telephone installations, and particularly to installations wherein all-relay equipment has heretofore been regarded as incapable, impractical, or impossible for use. In addition, the present invention provides flexibility and performance heretofore completely unrealized in telephone systems.

While I have described what I regard to be a preferred embodiment of my invention, it will be apparent that variations, rearrangements, modifications and changes can be made therein without departing from the scope of my invention, as defined by the appended claims.

I claim:

1. In electric apparatus, a jack comprising a pair of separable units, each unit including a plurality of banks of conductors, said banks of conductors being arranged in a similar manner on each unit whereby each bank on one unit is paired with a bank on the other unit and actuator means movable to force the conductors of each one of said banks of said one unit in succession into engagement with the contactors of the paired banks of the other unit.

2. In electric apparatus, a jack comprising a pair of separable units, each unit including a plurality of banks of conductors, said banks of conductors being arranged in a similar manner on each unit whereby each bank on one unit is paired with a bank on the other unit, cooperating guide means on each unit for properly positioning said units with said conductors of said paired banks in paired non-contacting relation, and actuator means on said one unit movable to force in a given step sequence, the conductors of each one of said banks of said one unit into engagement in succession with the paired contactors of the paired banks of the other unit.

3. In electric apparatus, a jack comprising a pair of separable units, each unit including a plurality of banks of conductors, said banks of conductors being arranged in a similar manner on each unit whereby each bank on one unit is paired with a bank on the other unit, and actuator means carried by one of said units to exert a force on the conductors of each bank on said one unit substantially normal to one of said banks to force same into contact with the conductors of the paired bank on the other unit, and means for transmitting said force applied to said first bank through further banks on said one unit to force same into engagement with the paired banks on said other unit.

4. In electric apparatus, a jack comprising a pair of separable units, each unit including a plurality of banks of conductors, said banks of conductors being arranged in a similar manner on each unit whereby each bank on one unit is paired with a bank on the other unit, cooperating guide means on each unit for properly positioning said units with respect to each other to pair said banks of conductors, and actuator means including a first operating member carried by one of said units for forcing the conductors of one bank on said one unit into contact with the conductors of the paired bank on the other unit responsive to a given movement of said operating member, a further slave member for each additional bank located adjacent thereto for forcing the conductors of its adjacent bank on said one unit into contact with the conductors of the corresponding paired bank on the other unit responsive to actuation of said one bank by said first operating member.

5. A jack unit comprising a pair of separable units, each unit including a plurality of sets of contactors, said contactors being arranged in a similar manner on each unit whereby each contactor on one unit is paired with a contactor on the other unit, an actuator member movable to force the first set of adjacent contactors on said one unit into engagement with the paired contactors of the other unit and actuating means disposed between each set of contactors, each actuating means being operable responsive to the application of forces to one bank adjacent thereto with movement of said first actuator member to move the other adjacent set of contactors into engagement with the corresponding paired contactors of the other unit.

6. A jack unit comprising a pair of separable units, each unit including a plurality of similar banks of contactors arranged in a given sequence, said banks of contactors being arranged in a similar manner on each unit whereby each contactor of each bank on one unit is paired with a contactor of a bank on the other unit, and actuator means including an operating member for simultaneously moving the contactors of a first and second bank on one unit into engagement with the paired banks on the other unit, and further operating means operated by forces transmitted through said first and second banks to force the contactors of further banks on said one unit in step sequence into engagement with the paired contactors of the paired banks of the other unit.

7. A jack comprising a pair of units adapted to be associated with one another, each unit including a plurality of reeds, cooperating guide means on each of banks of said units for aligning the reeds of the banks of one unit with the reeds of the corresponding banks of the other unit as said units are moved into association with one another, and an actuator carried by one of said units mounted centrally of said banks and movable to force the reeds of the adjacent ones of said banks on said one unit into engagement with the reeds of the other unit, and further actuator means mounted for movement by said adjacent banks with the operation thereof to move further banks on said one unit into engagement with the corresponding reeds on said other unit.

8. In a telephone apparatus: a first jack unit including a support member, a pin projecting from said support member, and a plurality of banks of reeds carried in spaced parallel relation by said support member on both sides thereof; a second jack unit including a support member having an aperture therein of a size to conformably receive said pin, a frame secured to said support member, a plurality of banks of reeds carried in spaced parallel relation by said frame on both sides thereof, a primary actuator pivotally mounted on said frame intermediate said banks of reeds, and secondary actuators carried by said frame and positioned between adjacent banks of reeds on both sides of said frame; said jack units being adapted to be operatively associated with one another to effect contact between the reeds thereof; said banks of reeds being so disposed on each jack unit with respect to said pin and said aperture respectively that, as said units are moved into association, said pin is conformably received in said aperture to position the reeds of each bank on one jack unit in alignment with the reeds of one bank on the other jack unit; said primary actuator being movable after positioning of said units to force the inner bank of reeds on each side of said frame of said second jack unit into engagement with the inner bank of reeds on each side of the support member of said first jack unit and to move said secondary actuators to force the other banks of reeds of said second jack unit into engagement with the respective banks of reeds of said first jack unit; and detent means to lock said primary actuator in position to retain said reeds in pressure contact.

9. In telephone apparatus, a supporting frame, a jack unit mounted on said frame, a strip adapted to be secured to said frame, a plurality of relays carried by said strip, a jack unit mounted on said strip, said strip mounted jack unit including a plurality of banks of contactors having electric connection with said relays, said frame mounted jack unit including a plurality of banks of contactors having electric connection with frame mounted circuits, cooperating guide means on said frame mounted jack unit and said strip for properly positioning said strip with respect to said frame and said strip mounted jack unit with respect to said frame mounted jack unit with each bank of contactors of one jack unit aligned with a corresponding bank of contactors of the other jack unit, fastening means for removably securing said strip to said frame, and actuator means on one of said units movable to force in a given sequence the contactors of the successive banks on said one unit into engagement with the corresponding bank on the other unit.

10. In electric apparatus, a jack comprising a pair of separable units, each unit including a plurality of banks of conductors, said banks of conductors being arranged in a similar manner in each unit whereby each bank in one unit is paired with a corresponding bank in the other unit, actuator means mounted on one of said units including an operating member mounted intermediate a first and second one of said banks on said one unit, said operating member having a non-operative position in which said member is out of contacting engagement with said first and second banks and said conductors on said units are in non-contacting relation with respect to each other, and an operative position in which said member simultaneously engages each contact of said first and second bank and moves same simultaneously into pressure engagement with the contacts of the corresponding banks of said other unit.

11. In electric apparatus, a jack comprising a pair of separable units, each unit including a plurality of banks of conductors, said banks of conductors being arranged in a similar manner in each unit whereby each bank in one unit is paired with a bank in the other unit, guide means for positioning the units with the conductors on said units in non-contacting relation with respect to each other, and actuator means including an operating member mounted for rotation about a given axis located intermediate the first and second one of said banks, said member having a non-operative position in which it is out of engagement with said first and second banks, and an operative position in which said member simultaneously forces each of the contacts of said first and second banks on said one unit into contact with the conductors of the corresponding bank on said other unit, and locking means for maintaining said member locked in its operative position as moved thereto.

12. An arrangement as set forth in claim 18 in which said operating member comprises a rectangular shaped member mounted with two of its edges forming working surfaces and in which said first position for said member is in a plane oblique to the plane of the adjacent banks and said second position is in a plane substantially normal to the conductors on said banks to thereby cause said working edges to force said conductors of the adjacent banks on said one unit into contact with the conductors of the corresponding banks on said other unit.

References Cited in the file of this patent

UNITED STATES PATENTS

| | | |
|---|---|---|
| 1,714,611 | Merk | May 28, 1929 |
| 1,809,025 | Couser | June 3, 1931 |
| 1,917,009 | Betts et al. | July 4, 1933 |
| 2,237,666 | Hanson et al. | Apr. 8, 1941 |
| 2,289,172 | Beal | July 7, 1943 |
| 2,459,237 | Mentor | Jan. 18, 1949 |
| 2,500,292 | Milhench et al. | Mar. 14, 1950 |
| 2,512,908 | Arndt | June 27, 1950 |
| 2,561,426 | Stearn et al. | July 24, 1951 |